United States Patent
Thangadurai et al.

(10) Patent No.: US 7,171,547 B1
(45) Date of Patent: Jan. 30, 2007

(54) METHOD AND APPARATUS TO SAVE PROCESSOR ARCHITECTURAL STATE FOR LATER PROCESS RESUMPTION

(75) Inventors: George Thangadurai, Santa Clara, CA (US); Erik T. Lode, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,448

(22) Filed: Dec. 28, 1999

(51) Int. Cl.
*G06F 9/40* (2006.01)

(52) U.S. Cl. ................................................. 712/228

(58) Field of Classification Search ............... 712/239, 712/228, 233, 244
See application file for complete search history.

(56) References Cited

U.S. PATENT DOCUMENTS

| | | | | |
|---|---|---|---|---|
| 4,484,271 A * | 11/1984 | Miu et al. | | 712/244 |
| 5,701,493 A * | 12/1997 | Jaggar | | 710/261 |
| 5,737,625 A * | 4/1998 | Jaggar | | 712/41 |
| 5,859,999 A * | 1/1999 | Morris et al. | | 712/224 |
| 5,864,701 A * | 1/1999 | Col et al. | | 710/260 |
| 5,966,734 A * | 10/1999 | Mohamed et al. | | 711/173 |
| 5,978,857 A * | 11/1999 | Graham | | 719/312 |
| 6,003,129 A * | 12/1999 | Song et al. | | 712/244 |
| 6,009,512 A * | 12/1999 | Christie | | 712/226 |
| 6,061,711 A * | 5/2000 | Song et al. | | 718/108 |
| 6,128,672 A * | 10/2000 | Lindsley | | 710/19 |
| 6,260,057 B1* | 7/2001 | Eykholt et al. | | 718/102 |
| 6,279,102 B1* | 8/2001 | Morrison | | 712/216 |
| 6,289,435 B1* | 9/2001 | Lange et al. | | 712/32 |
| 6,430,682 B1* | 8/2002 | Dwyer, III | | 712/234 |
| 6,487,630 B2* | 11/2002 | Bui | | 711/109 |
| 6,499,078 B1* | 12/2002 | Beckert et al. | | 710/260 |
| 6,513,109 B1* | 1/2003 | Gschwind et al. | | 712/200 |
| 6,772,325 B1* | 8/2004 | Irie et al. | | 712/238 |
| 6,871,275 B1* | 3/2005 | Poplinger et al. | | 712/237 |

* cited by examiner

*Primary Examiner*—Eric Coleman
(74) *Attorney, Agent, or Firm*—Blakely, Sokoloff, Taylor & Zafman LLP

(57) ABSTRACT

A method and an apparatus for restoring logic states using programming code are disclosed. In one embodiment, the process of a data processing system identifies a first logic value stored in a first register and branches to a first location within the programming code based upon the first logic value. The execution of the programming code occurs in a processor firmware layer. The first register can be used as a scratch register for the subsequent instruction.

27 Claims, 11 Drawing Sheets

METHOD AND APPARATUS TO SAVE PROCESSOR ARCHITECTURAL STATE FOR LATER PROCESS RESUMPTION

BACKGROUND OF THE INVENTION

1. Field of the Invention

The present invention relates generally to the field of computer systems. Specifically, the present invention relates to data storage.

2. Description of the Related Art

Computer systems encounter many situations where some level of system state preservation is necessary. Several examples of such situations include machine checks, processing interrupts, context switching, and low power operations. In the following descriptions, the terms machine check, processing interrupt, and system exception are synonymous.

An interrupt typically involves the suspension of processing at a first location of a program and transfer of processing to a second location of the program upon the occurrence of an error in the system. After transferring to the second location, several system and processor parameters and registers (collectively known as architectural state or processor state) are preserved by being stored to a random access memory ("RAM"). Upon return from the interrupt, the architecture state may be restored from the memory and processing control may return to a position following the location at which the interrupt occurred.

However, during the process of saving architecture state, scratch registers are typically needed for temporary storage, such as, for example, a register for indexing. Since registers, such as general-purpose registers, predicate registers, et cetera, may contain architecture state, they are not available to be used as scratch registers for saving the architecture state unless they are saved first. Consequently, there is a problem of lacking temporary storage location to save the contents of scratch registers so that they can be used to save the architectural state.

SUMMARY OF THE INVENTION

A data processing system identifies a first logic value stored in a first register and branches to a first predefined location within the programming code based upon the first logic value. The first register is used as a scratch register during the execution of the programming code. After the execution of the programming code, the first logic value is restored in the first register.

Additional features and benefits to the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
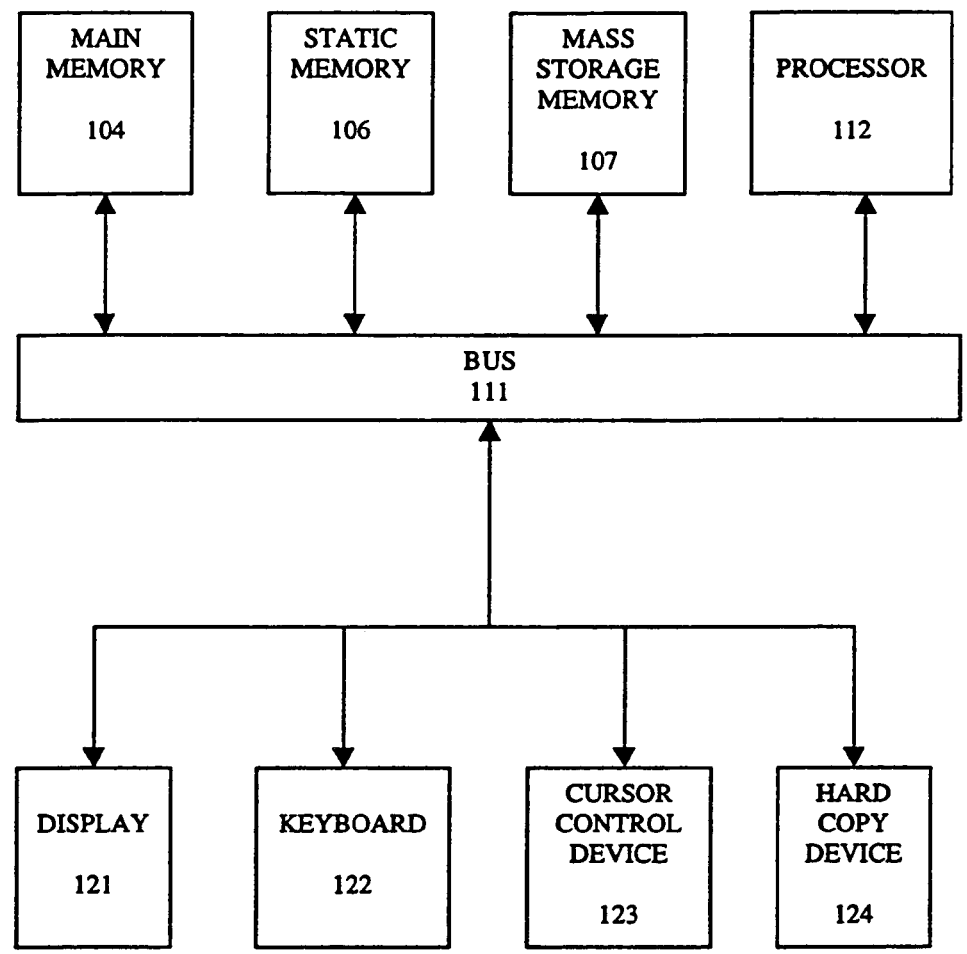
FIG. 1 is a block diagram of one embodiment of the computer system.

A method and an apparatus for restoring logic states in registers is described.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise in the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

Restoring a previously stored value from a temporary storage, such as a register, using programming code after the temporary storage is used as a scratch register is described. In one embodiment, the process of a data processing system identifies a first logic value stored in a first register and branches to a first location of the programming code in response to the first logic value. The first logic value can be restored back to the first register since the first location is specifically dedicated to the first logic value. Accordingly, the first register can be used as a scratch register for the subsequent instruction execution. After completion of the execution, the first logic value is restored in the first register in response to the first location.

Referring to FIG. 1, an embodiment of a computer system 100 is shown. Computer system 100 comprises a bus or other communication means 111 for communicating information, and a processor 112 coupled with bus 111 for processing information. Processor 112 includes microprocessor, but not limited to a microprocessor, such as an Intel Architecture Microprocessor™, manufactured by Intel Corporation of Santa Clara, Calif. Processor 112 may also be another processor such as the PowerPC™, Alpha™, et cetera.

System 100 further comprises a random access memory (RAM), or other dynamic storage device 104 (referred to as main memory) coupled to bus 111 for storing information and instructions to be executed by processor 112. Main memory 104 may also be used for storing temporary variables or other intermediate information during execution of instructions by processor 112. Computer system 100 also comprises a read only memory (ROM) and/or other static storage device 106 coupled to bus 111 for storing static information and instructions for processor 112, and a data storage device 107, such as a magnetic disk or optical disk and its corresponding disk drive. Data storage device 107 is coupled to bus 111 for storing information and instructions.

Computer system 100 may further be coupled to a display device 121, such as a cathode ray tube (CRT) or liquid crystal display (LCD), coupled to bus 111 for displaying information to a computer user. An alphanumeric input device 122, including alphanumeric and other keys, may also be coupled to bus 111 for communicating information and command selections to processor 112. An additional user input device is cursor control 123, such as a mouse, trackball, trackpad, stylus, or cursor direction keys, coupled to bus 111 for communicating direction information and command selections to processor 112, and for controlling cursor movement on display 121.

Another device which may be coupled to bus 111 is hard copy device 124, which may be used for printing instructions, data, or other information on a medium such as paper, film, or similar types of media. Furthermore, a sound recording and playback device, such as a speaker and/or microphone may optionally be coupled to bus 111 for audio interfacing with computer system 100. However, it can be appreciated that other configurations of the computer system may include some or all of the devices.

Figure 2:
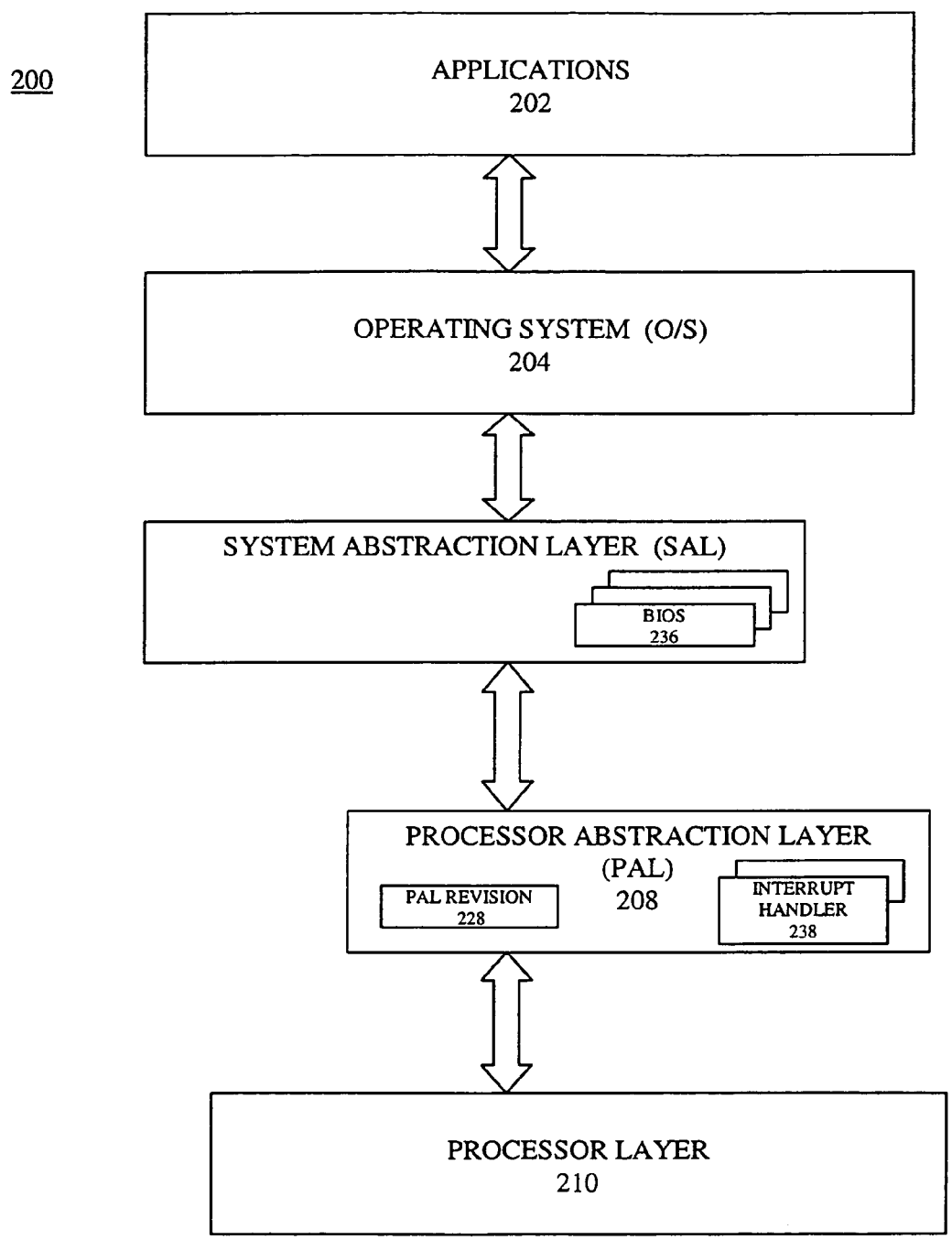
FIG. 2 illustrates one embodiment of computer system configuration.

FIG. 2 illustrates one embodiment of computer architecture 200. Architecture 200 contains an application layer 202, an operating system ("O/S") 204, a system firmware layer ("SF") 206, a processor firmware layer ("PF") 208, and a processor layer 210. In one embodiment, PF 208 is also referred to as the process abstraction layer ("PAL"). Other layers or levels may be added, such as, for example, an assembly layer and a microcode layer.

Application layer 202, which is referred to herein as a problem-oriented language, includes high level languages used by application programmers or users to solve problems. High level languages, such as, for example, Ada, BASIC, C, $C^{++}$, COBOL, PASCAL, may be included in application layer 202. Operating system 204, such as Windows, DOS, and UNIX, is used to support application layer 202 by coordinating the use of the hardware among the various application programs.

SF 206 is a layer that is situated between operating system 204 and PF 208 where SF 206 includes various control codes, such as a basic input-output system ("BIOS") 236 for facilitating system operations. For example, BIOS 236 controls the low-level resources of the computer systems. SF 206 is also known as a system firmware.

A specific version of the processor needs a specific version of PF before the processor can function properly. In other words, a current version of PF may be used with a current or earlier released processor. It is appreciated that a system may contain multiple processors and each processor may require different version of PF.

PF 208 is situated between SF 206 and processor layer (or hardware layer) 210. PF 208 is often considered a part of a processing unit and is responsible for executing non-critical processing functions, such as, for example, PF_revision 228 or interrupt handler 238. In one embodiment, interrupt handler 238 saves the architectural state in a non-cacheable area of the memory.

For example, when PF 208 is unable to handle the error, PF 208 collects the error information and, subsequently, passes the error information to SF 206. Once the error is recovered or fixed, the process returns to the location in the program immediately following the location at which the interrupt occurred. It should be appreciated that PF 208 may include other non-time critical functions.

Processor layer 210, which is also referred to herein as hardware layer, including execution devices, memory devices, decoders, et cetera, is the lowest level. Processor layer 210 may further contain a digital layer where various circuits are used to implement logic functions. The processor layer 210 might be further divided into other layers such as a gate layer and a semiconductor layer. It should also be appreciated that moving non-time critical functions from processor layer 210 to PF 208 enhances overall system performance.

Figure 3:
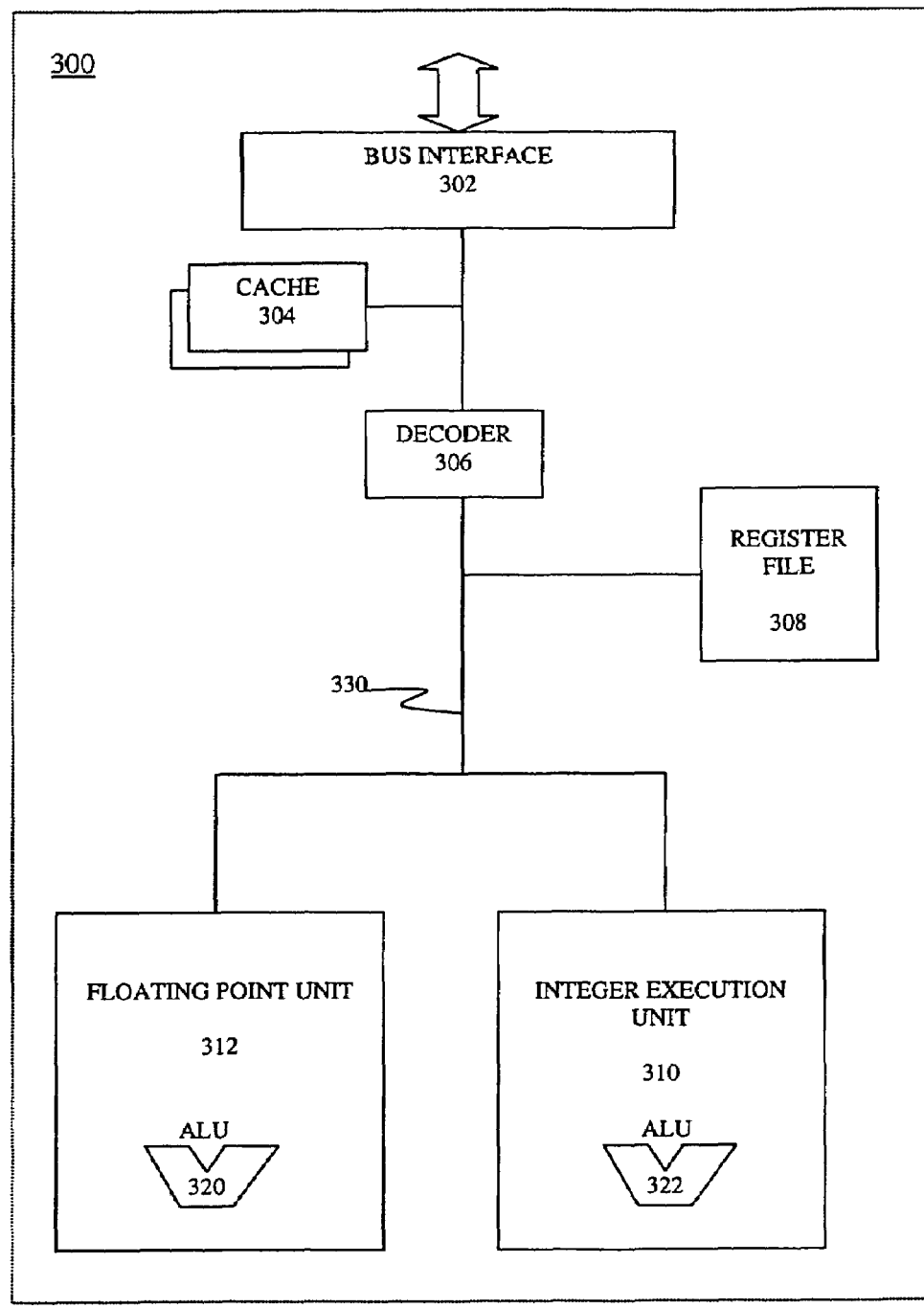
FIG. 3 is a block diagram of one embodiment of the processing unit.

FIG. 3 is a block diagram of one embodiment of the processing unit 300. Processing unit 300 includes a bus interface 302, a cache 304, a decoder 306, a register file 308, a floating-point execution unit 312, and an integer execution unit 310. Of course, processing unit 300 may contain additional circuitry, which is not necessary to understanding the invention.

Integer execution unit 310, which further includes an integer arithmetic logic unit ("ALU") 322, is used for executing integer instructions received by processing unit 300. Integer execution unit 310 performs various data manipulations including storing, fetching, addressing, and integer calculations. Integer execution unit 310 is further coupled to floating-point execution unit 312. In one embodiment, integer execution unit 310 includes floating-point execution unit 312. Floating-point execution unit 312 includes a floating-point ALU 320 to perform floating-point arithmetic.

Integer execution unit 310 is coupled to a register file 308 via an internal bus 330. Register file 308 represents a storage area on processing unit 300 for storing information, including data. One embodiment of the register file 308 contains various special registers, such as machine specific registers, status registers, et cetera. Integer execution unit 310 is further coupled to a cache 304 and a decoder 306. Cache 304 is used to cache data and/or control signals from, for example, main memory 104 as shown in FIG. 1. Decoder 306 is used for decoding instructions received by processing unit 300 into control signals and/or micro-code entry point. In response to these control signals and/or microcode entry point, integer execution unit 310 performs the appropriate operations. Decoder 306 may be implemented using any number of different mechanisms (e.g., a look-up table, a hardware implementation, etc.).

Bus interface 302 is used to communicate between processing unit 300 and the rest of the components in the system, such as main memories, input/output devices, and system bus. Other components may be included in processing unit 300, such as a second level cache.

Figure 4:
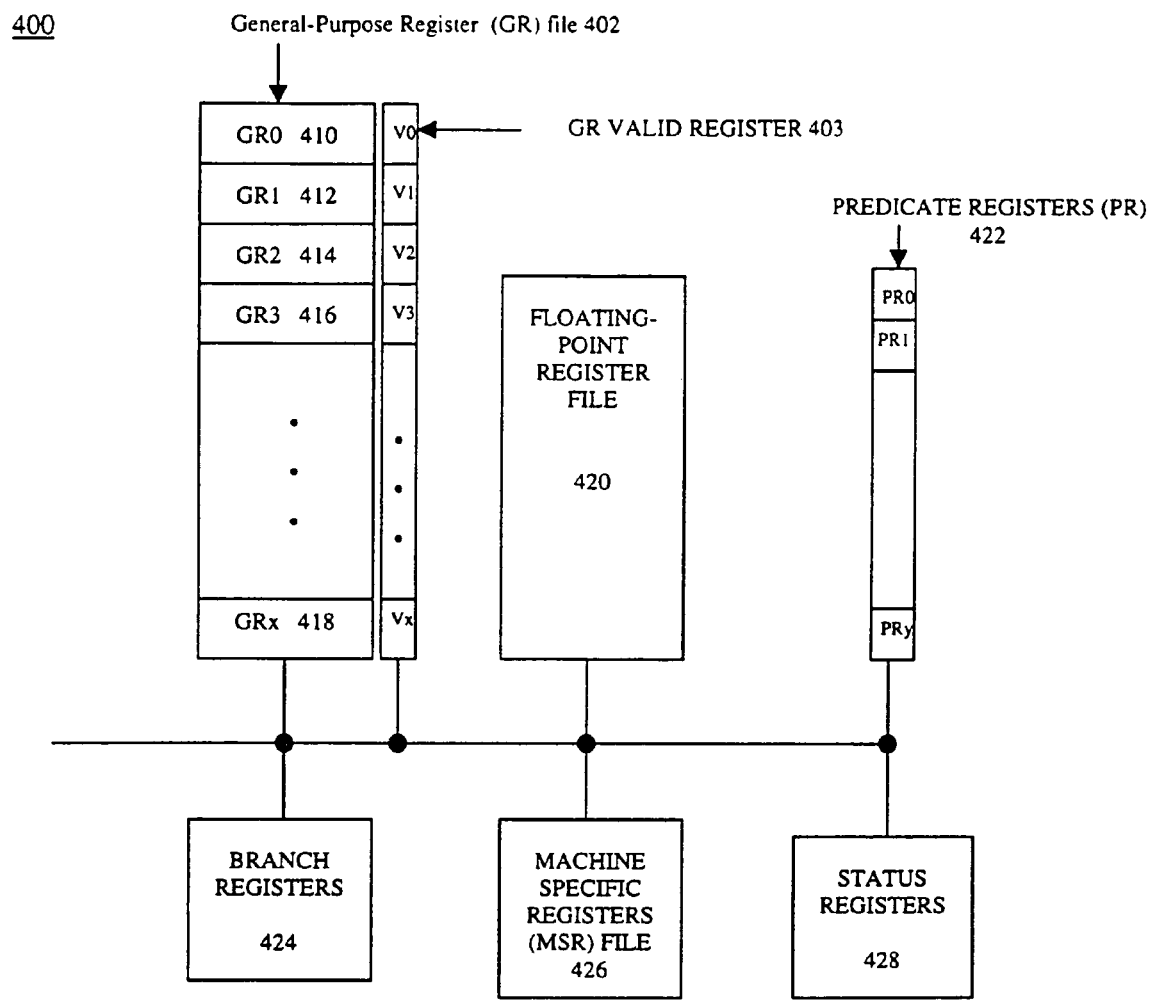
FIG. 4 is a block diagram of one embodiment of a register file.

FIG. 4 is a block diagram illustrating one embodiment of the register file 400 used in processing unit 300. Register file 400 contains various registers for temporary storage locations during instruction execution. In one embodiment, the register file 400 includes a general-purpose register ("GR") file 402, a GR valid register 403, a floating-point register file 420, predicate registers ("PR") 422, branch registers 424, machine specific registers ("MSR") 426, and status registers 428.

GR file 402 contains multiple GRs. In one embodiment, each GR may be 32, 64, 128, or 256 bits wide. In one embodiment, GR file 402 may contain up to 128 GRs where each GR can be used by any execution unit. GR valid register 403 is a bit accessible register where each bit corresponds to a GR in GR file 402. A bit accessible register is a register in which every bit stored therein can be independently fetched and stored. Each bit of GR valid register 403 indicates whether the corresponding GR contains valid data. For example, V0, V1, V2, V3, ... Vx of GR valid register 403 are used to indicate whether GR0 410, GR1 412, GR2 414, GR3 416, ... GRx 418, respectively, contain valid data.

Floating-point register file 420 commonly contains multiple floating-point ("FP") registers where each FP register is typically dedicated to floating-point unit 312. FP registers provide temporary storage for the floating-point unit 312 during FP instruction execution. Predicate register ("PR") 422 is also a bit accessible register used for branch predication and conditional move instructions. Moreover, status registers 428 stores the status of processing unit 300 and branch registers 424 store instruction addresses, which branch instructions use to store branch targets.

In one embodiment, interrupts are typically caused by errors or exceptions during instruction execution. In order to handle an interrupt, the architectural state is first saved so that the process can return to the same states after the interrupt is recovered. Accordingly, MSR 426 may be used to save the architectural state. It is appreciated that other types of registers may be included in register file 400, such as integer registers, but they are not necessary to comprehending the invention.

Figure 5:
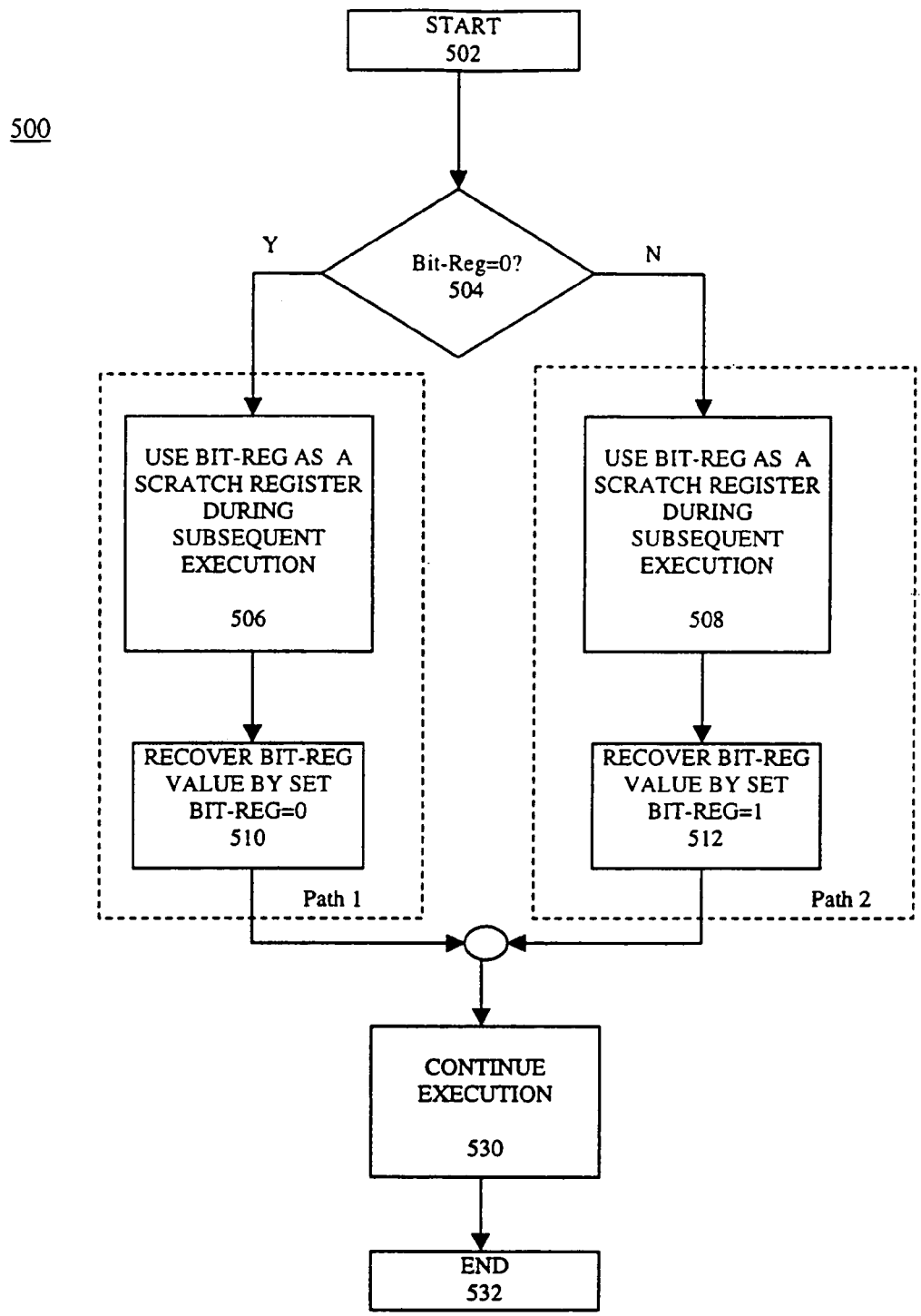
FIG. 5 is a flow chart illustrating one embodiment of a process for storing one bit data in the code.

FIG. 5 is a flow chart 500 illustrating one embodiment for using programming code to store one bit of data. A process begins at start block 502 and proceeds to block 504 where the process examines whether a bit register ("bit-reg") is zero. Bit-reg can be any bit accessible register.

If block 504 is true, which indicates that bit-reg is zero, the process proceeds from block 504 to block 506. At block 506, the process uses bit-reg as a scratch register during the subsequent instruction execution. A scratch register for purposes herein is a register that can be used for temporary storage or indexing during instruction execution. For example, the process may use a bit-reg as a scratch register during a process of saving architecture state. After block 506, the process proceeds to block 510 where the value of the bit-reg is restored when the scratch register is no longer being needed for saving architecture state. At block 510, the process sets bit-reg to zero in response to the location of the programming code. After block 510, the process proceeds to block 530.

If block 504 is false, which indicates bit-reg is one, the process proceeds from block 504 to block 508. At block 508, the process uses bit-reg as a scratch register during the subsequent instruction execution. It should be noted that procedures executed in block 508 are similar to block 506. After block 508, the process proceeds to block 512 where the value of the bit-reg is recovered when the scratch register is no longer being needed for saving architecture state. At block 512, the process sets bit-reg to one in response to the location of the programming code. After block 512, the process proceeds to block 530.

At block 530, the process continues to execute the rest of the programming code using the restored value of the bit-reg. Upon completion of execution, the process moves to block 532 where the process ends. It should be noted that the different logic value would be restored in the bit-reg by the different path of the flow chart 500. For example, path 1 of the flow chart 500 restores a value of zero to the bit-reg while path 2 restores a value of one to the bit-reg. The same approach may be used to restore more than two values. For example, four paths may be used to restore 4 values, eight paths may be needed to restore 8 values, and sixteen paths may be required to store 16 values, and so forth.

Figure 6:
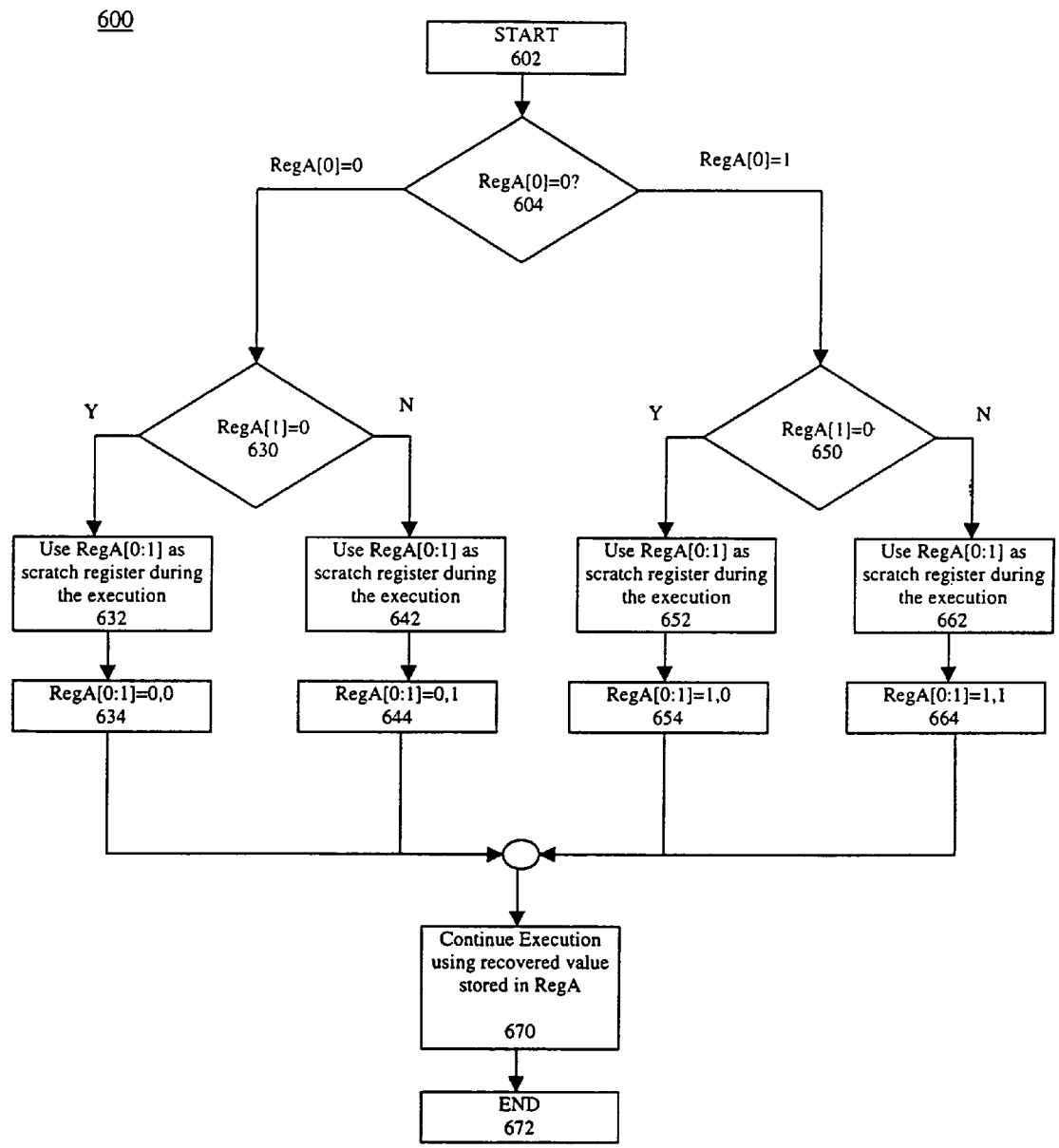
FIG. 6 is a flow chart illustrating one embodiment of a process for storing two bits data in the code.

FIG. 6 is a flow chart 600 illustrating one embodiment of a process for using the programming code to store two logic values or two-bit data.

Referring to FIG. 6, the process begins at block 602 and proceeds to block 604 where the process examines whether the first bit of register A ("RegA[0]") is zero. RegA can be any register, such as GR, predicate register, et cetera.

If block 604 is true, which indicates that RegA[0] is zero, the process proceeds from block 604 to block 630. At block 630, the process examines whether the second bit of register A ("RegA[1]") is zero. If block 630 is true, which indicates that RegA[1] is zero, the process proceeds from block 630 to block 632. At block 632, the process uses RegA ("RegA[0:1]") as a scratch register during subsequent instruction execution. When the scratch register is no longer needed, the process proceeds from block 632 to block 634 where the value of RegA[0:1] is restored. At block 634, the process restores RegA[0:1] to zeros. After completion of restoration, the process proceeds from block 634 to block 670.

If block 630 is false, which indicates that RegA[1] is one, the process proceeds from block 630 to block 642. At block 642, the process uses RegA[0:1] as a scratch register during the subsequent instruction execution. When the scratch register is no longer needed, the process proceeds from block 642 to block 644 where the value of RegA[0:1] is restored. At block 644, the process restores a zero to RegA[0] and a one to RegA[1]. After completion of recovery, the process proceeds from block 644 to block 670.

If block 604 is false, which indicates that RegA[0] is one, the process proceeds from block 604 to block 650. At block 650, the process examines whether RegA[1] is zero. If block 650 is true, which indicates that RegA[1] is zero, the process proceeds from block 650 to block 652. At block 652, the process uses RegA[0:1] as a scratch register for the subsequent instruction execution. When the scratch register is no longer needed, the process proceeds from block 652 to block 654 where the value of RegA[0:1] is restored. At block 654, the process restores a one to RegA[0] and a zero to RegA[1]. After completion of recovery, the process proceeds from block 654 to block 670.

If block 650 is false, which indicates that RegA[1] is one, the process proceeds from block 650 to block 662. At block 662, the process uses RegA[0:1] as a scratch register during the subsequent instruction execution. Upon completion of the execution, the process proceeds from block 662 to block 664 where the value of RegA[0:1] is restored. At block 664, the process restores RegA[0:1] to ones. After completion of recovery, the process proceeds from block 664 to block 670.

At block 670, the process continues to execute the rest of the programming code. After block 670, the process moves to block 672 where the process ends. It should be noted that blocks 632, 642, 652, and 662 essentially perform the same tasks. Moreover, the same approach may be used to store more than two bits.

The following example illustrates an embodiment of a processor storing two-bit logic states in a programming code. In this example, the processor is a 64-bit processor architecture that consists 128 GRs, NaT ("Not a Thing") bits, predicate registers, branch registers, floating-point registers, application registers, control registers, and status registers. In one embodiment, NaT bit is a bit accessible register. Each NaT bit is associated with a corresponding GR where the NaT bit indicates whether the corresponding GR contains valid data. In other words, the NaT bit performs similar functions as the GR valid register 403 shown in FIG. 4. In an alternative embodiment, the processor uses a reduced set number of resources to handle an interrupt. In other words, only a reduced set number of GRs need to be saved for architecture state before handling the interrupt.

Figure 7:
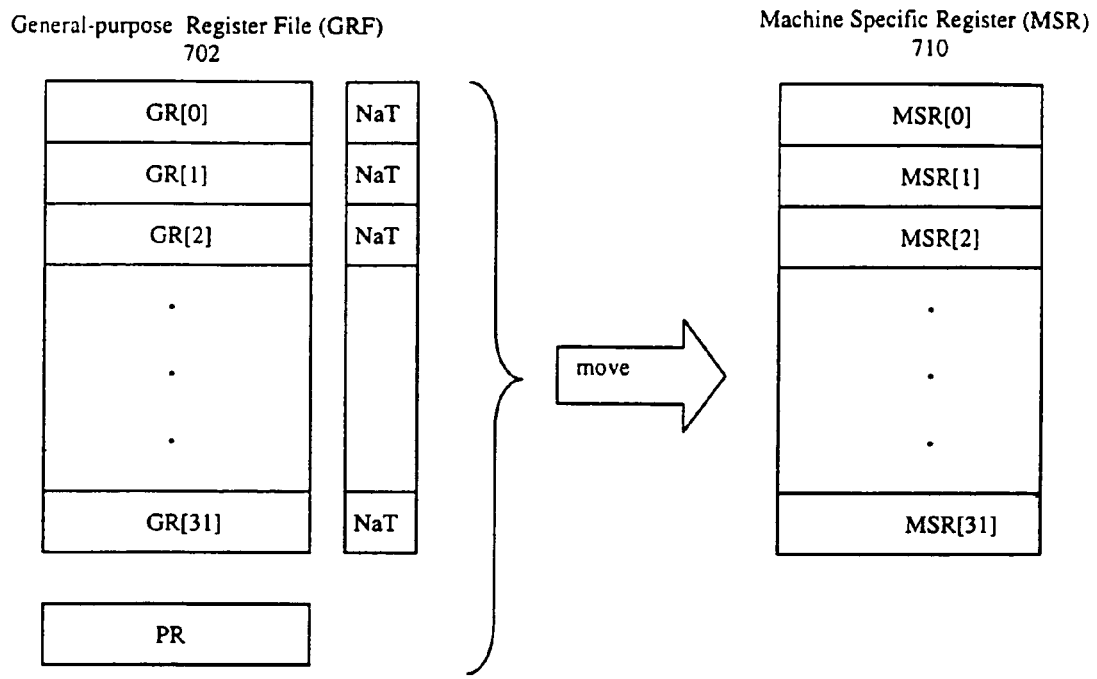
FIG. 7 illustrates one embodiment of saving the content of general-purpose registers in machine specific registers.

FIG. 7 is a block diagram 700 illustrating an embodiment of saving GRs in MSRs using conditional move operations when an interrupt occurs. Referring to FIG. 7, a general-purpose register file ("GRF") 702, multiple NaT bits, and MSR 710 are shown. GRF 702 contains first 32 GRs of 128 GRs, which is a part of the reduced set of registers (or resources) that are needed for saving the architecture state. In this example, the first 32 GRs must be saved before the interrupt can be handled. In other words, the interrupt handler uses the first 32 GRs to recover from the interrupt.

Each NaT bit indicates whether the corresponding GR contains valid data. If NaT bit is not set, the GR associated with the NaT bit contains valid data and it must be saved in the corresponding MSR before handling the interrupt. If NaT bit is set, the GR associated with the NaT bit contains invalid data and consequently, the preservation of the content of GR would not be necessary.

Figure 8:
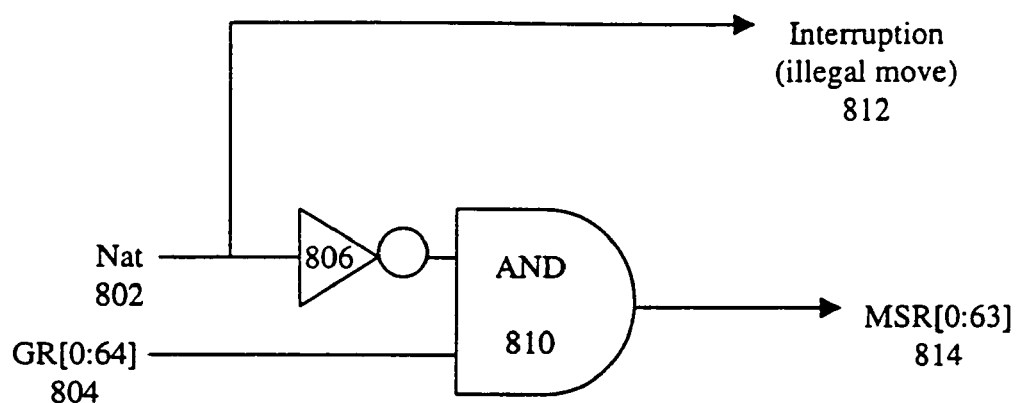
FIG. 8 illustrates an embodiment of a NaT ("Not a Thing") operation.

FIG. 8 shows a logic diagram 800 illustrating a function of an embodiment of NaT bit. Referring to FIG. 8, an inverter 806 and an AND gate 810 are shown. The input of inverter 806 is fed by a NaT bit 802 and the output of the inverter 806 is connected to the input of AND gate 810. The other input of AND gate 810 is fed by GR 804. In operation, if NaT is not set, which indicates that the content of GR 804 is valid, GR 804 is passed to MSR 814. However, if NaT 802 is set, which indicates the content of corresponding GR 804 is not valid, an interruption is taken to indicate an illegal move 812. Thus, a move from GR to MSR will fail when an illegal move occurs.

Figure 9:
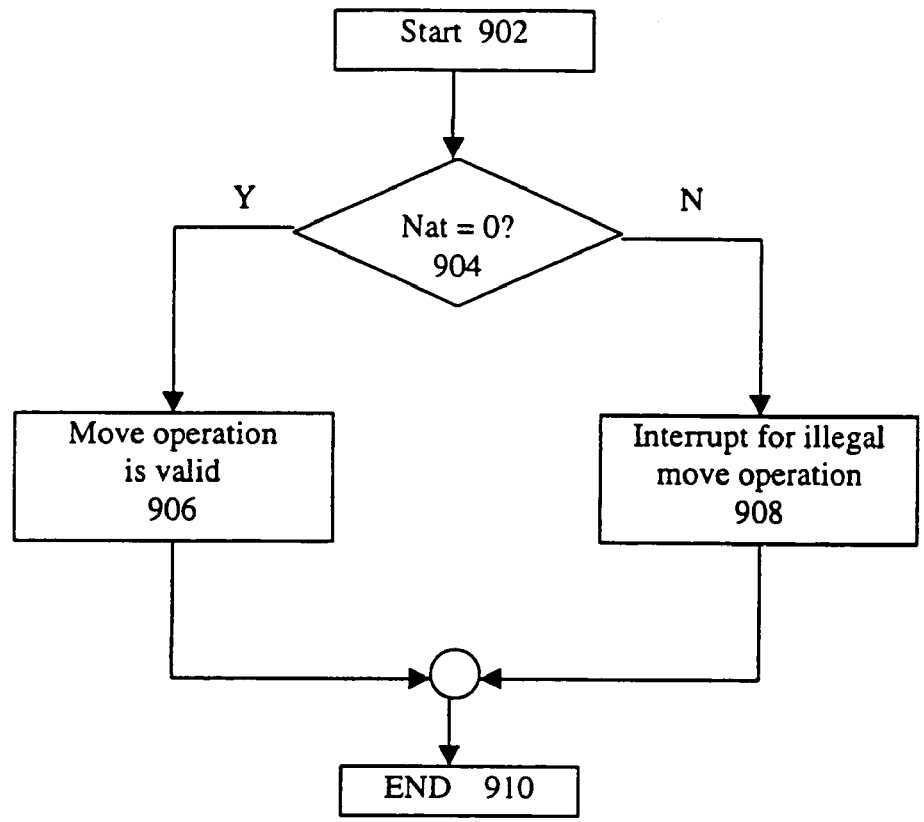
FIG. 9 is a flow chart illustrating an embodiment of a process for implementing a NaT operation.

FIG. 9 is a flow chart 900 illustrating an embodiment of a process of performing NaT operation. Referring to FIG. 9, a process of move operation starts at block 902 and proceeds to block 904 where the process checks whether NaT bit equals to zero or not. If block 904 is true, which indicates that the GR corresponding to the NaT bit contains valid data, the process proceeds to block 906. Block 906 indicates that the move operation is proper. After block 906, the process moves to block 910 where the process ends.

On the other hand, if block 904 is false, which indicates that data in the corresponding GR is invalid, the process proceeds to block 908 where an interruption for illegal move is asserted. After block 908, the process proceeds to block 910 where the process ends.

It should be noted that during a recovery of an interrupt, a system commonly cannot handle another interrupt before the first interrupt is recovered because the second interrupt often writes over and destroys architectural state saved for the first interrupt. Accordingly, moving GR to MSR during an interrupt recovery may cause a second interrupt if the NaT bit is set. To avoid a second interrupt, a conditional move operation is used in this example.

Figure 10:
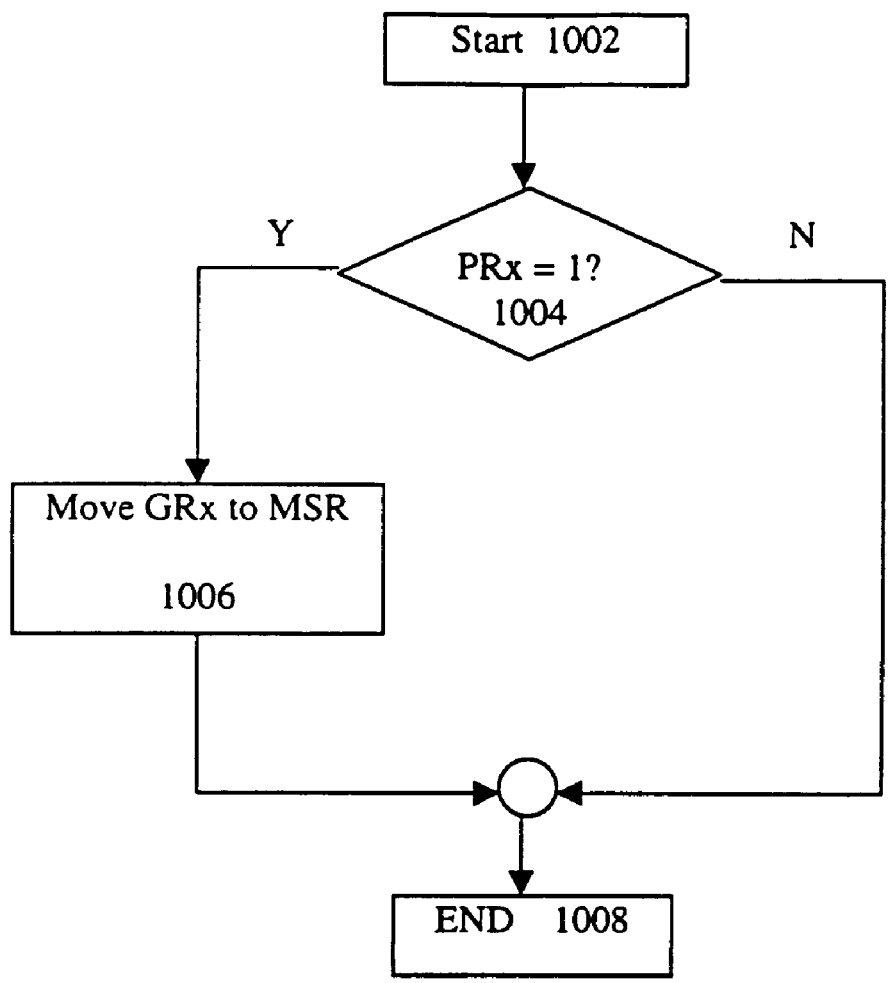
FIG. 10 is a flow chart illustrating one embodiment of a process for performing a conditional move operation using a predicate register as a condition.

FIG. 10 is a flow chart 1000 illustrating one embodiment of a process for performing a conditional move operation using a predicate register as a condition. Referring to FIG. 10, the process for the conditional move operation starts at block 1002 and proceeds to block 1004 where the process checks whether the predicate register is zero. If block 1004 is true, which indicates that predicate register is one, the process moves to block 1006 where the move operation from GRx to MSR takes place. After block 1006, the process moves to block 1008 where the process ends.

If block 1004 is false, which indicates predicate register is zero, the process does nothing. After block 1004, the process proceeds to block 1008 where the process ends. The conditional move instruction 1010 can be represented as (PRx) move MSR[index]=GRx as shown in FIG. 10. Thus, a second interrupt can be avoided by using conditional move operation 1010 when the complement of the NaT bit is loaded to the predicate register. In other words, the move operation would not be performed if the condition fails.

Figure 11:
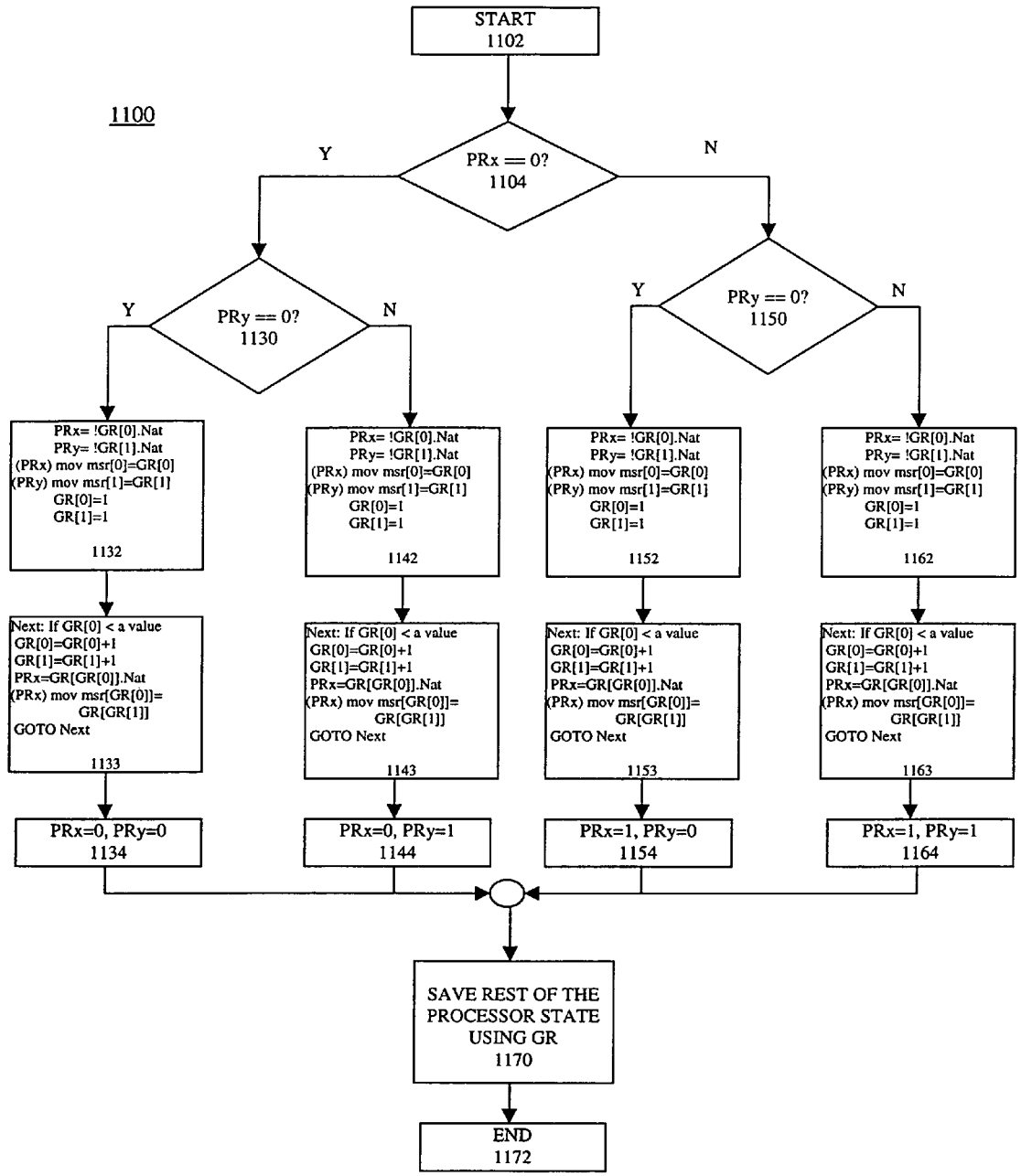
FIG. 11 is a flow chart illustrating one embodiment of a process for storing a two-bit data.

Since the predicate registers are typically considered as a part of the reduced set number of registers and they need to be saved before they can be used as conditions, FIG. 11 illustrates an example of storing the predicate registers in the programming code. Referring to FIG. 6, the process starts at block 1102 and proceeds to block 1104 where the process examines whether predicate register x ("PRx") is zero. If block 1104 is true, which indicates PRx is zero, the process proceeds to block 1130 where the process examines whether predicate register y ("PRy") equals zero.

If block 1130 is true, which indicates that PRy is zero, the process proceeds to block 1142. At block 1142, the process sets PRx equal to the complement of the value of bit position zero of NaT register, which is used to indicate the status of the general purpose register zero, hereinafter referred to as !GR[0].NaT, and PRy equal to !GR[1].NaT, which is the value of the complement of the bit position one of NaT register that is used to indicate the status of the general purpose register one. Upon properly setting PRx to the complement of the NaT bit corresponding to GR[0] and PRy to the complement of the NaT bit corresponding to GR [1], GR[0] is saved in MSR[0] if NaT is not set and GR[1] is saved in MSR[1] if NaT is not set. After saving GR[0] and GR[1], GR[0] and GR[1] become scratch registers and they may, in one embodiment, be used as indexing registers.

After block 1132, the process proceeds to block 1133 where the process checks whether GR[0] exceeds the predefined value. In one embodiment, the predefined value may be 16, 32, 64, or 128. If GR[0] is less than the predefined value, GR[0] and GR[1] are incremented and the remaining steps listed in block 1133 are performed. Once the process reaches to the end of block 1133, the process loops back to the beginning of block 1133. However, if GR[0] is equal or greater than the predefined value, the process exists block 1133.

Upon completion of block 1133, the process proceeds to block 1134 where the content of PRx and PRy are restored. PRx is restored to zero and PRy is restored to zero. After block 1134, the process proceeds to block 1170 to continue the execution.

If block 1130 is false, which indicates that PRx is zero and PRy is one, the process proceeds to block 1142 and block 1143 where the same steps listed in blocks 1132 and 1133, as described previously, are performed. Upon completion of block 1143, the process proceeds to block 1144 where the content of PRx and PRy are restored. PRx is restored to zero and PRy is restored to one. After block 1144, the process proceeds to block 1170 to continue the execution.

If block 1104 is false, which indicates PRx is one, the process proceeds to block 1150 where the process examines whether predicate register y ("PRy") equals zero.

If block 1150 is true, which indicates that PRy is zero, the process proceeds to block 1152 and block 1153 where the same steps listed in blocks 1132 and 1133, as described previously, are performed. Upon completion of block 1153, the process proceeds to block 1154 where the content of PRx and PRy are restored. PRx is restored to one and PRy is restored to zero. After block 1154, the process proceeds to block 1170 to continue the execution.

If block 1150 is false, which indicates that PRy is one, the process proceeds to block 1162 and block 1163 where the same steps listed in blocks 1132 and 1133, as described previously, are performed. Upon completion of block 1163, the process proceeds to block 1164 where the content of PRx and PRy are restored. PRx is restored to one and PRy is restored to one. After block 1164, the process proceeds to block 1170 to continue the execution.

At block 1170, the process saves the rest of the processor states. After block 1170, the process moves to block 1172 where the process ends.

It should be noted that all paths use similar blocks, such as blocks 1132 and 1133. However, the differences are the restoration blocks. As can be seen, this approach is not limited to store 2-bit information.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims, which in themselves recite only those features regarded as essential to the invention.

Thus, a method and apparatus for restoring logic states in a register using programming code have been described.

What is claimed is:

1. A method for restoring a memory value comprising:
   identifying a first logic value stored in a first register;
   branching to a first predefined location within programming code based upon the first logic value;
   utilizing the first register as a scratch register during execution of the programming code;
   restoring the first logic value back to the first register after execution of the programming code has finished.

2. The method of claim 1 further comprising detecting an occurrence of an interrupt during execution.

3. The method of claim 1 further comprising:
   identifying a second logic value stored in a second register;
   branching to a second predefined location within the programming code based upon the second logic value;
   utilizing the second register as scratch register during execution of the programming code;
   restoring the second logic value back to the second register in response to the second predefined location.

4. The method of claim 1, wherein the branching to a first predefined location further including identifying the first predefined location from a plurality of predefined locations in the programming code.

5. The method of claim 1 further comprising executing the programming code in a processor firmware layer.

6. The method of claim 1 further comprising storing the programming code in a non-volatile memory.

7. The method of claim 1 further comprising utilizing the first register as an index register during execution of the programming code.

8. The method of claim 1 further comprising utilizing the first register as a predicate register during execution of the programming code.

9. The method of claim 1 further comprising saving rest of processor states before execution of interrupt handlers.

10. A digital processing system comprising:
    an execution unit;
    a general purpose register file coupled to the execution unit containing a plurality of general-purpose registers;
    a memory coupled to the execution unit for storing a processor abstraction layer, the processor abstraction layer further including interrupt handlers, each of the interrupt handler further including saving architecture state code, the saving architecture state code further including a plurality of predefined sections, wherein each the predefined section corresponds to a logic value of a register that can be restored in response to the predefined sections, and wherein the execution unit branches to a first predefined section within programming code based upon the first logic value identified in the first register.

11. The digital processing system of claim 10, wherein the saving architecture state code is stored in a non-volatile memory.

12. The digital processing system of claim 10, wherein the register is multiple bits wide.

13. The digital processing system of claim 10, wherein the logic value can be restored in the register.

14. The digital processing system of claim 10, wherein the logic value is restored in a memory location.

15. The digital processing system of claim 10, wherein the register is a general-purpose register.

16. The digital processing system of claim 10, wherein the register is a predicate register.

17. An article of manufacture for use in a digital processing system for storing a logic value in a programming code, the article of manufacture comprising a tangible machine readable medium having machine readable program code embodied in the medium, the program code comprising:
   identifying a first logic value stored in a first register;
   branching to a first predefined location within programming code in response to the first logic value;
   utilizing the first register as a scratch register during execution of the programming code;
   restoring the first logic value back to the first register in response to the first predefined location.

18. The article of manufacture of claim 17, further including computer readable program code for:
   identifying a second logic value stored in a second register;
   branching to a second predefined location within the programming code in response to the second logic value;
   utilizing the second register as scratch register during execution of the programming code; and
   restoring the second logic value back to the second register in response to the second predefined location.

19. The article of manufacture of claim 17, wherein the branching to a first predefined location further including computer readable program code for identifying the first predefined location from a plurality of predefined locations in the programming code.

20. The article of manufacture of claim 17, further including computer readable program code for executing the programming code in a processor firmware layer.

21. A computer system comprising:
   means for identifying a first logic value stored in a first register;
   means for branching to a first predefined location within a programming code based upon the first logic value;
   means for utilizing the first register as a scratch register during execution of the programming code;
   means for restoring the first logic value back to the first register in response to the first predefined location.

22. The computer system of claim 21, further comprising means for detecting an occurrence of an interrupt during execution.

23. The computer system of claim 21, further comprising:
   means for identifying a second logic value stored in a second register;
   means for branching to a second predefined location within the programming code in response to the second logic value;
   means for utilizing the second register as scratch register during execution of the programming code;
   means for restoring the second logic value back to the second register in response to the second predefined location.

24. The computer system of claim 21, wherein the branching to a first predefined location further including means for identifying the first predefined location from a plurality of predefined locations in the programming code.

25. The computer system of claim 21, further comprising means for executing the programming code in a processor firmware layer.

26. The computer system of claim 21, further comprising means for storing the programming code in a non-volatile memory.

27. The computer system of claim 21, further comprising means for utilizing the first register as an index register during execution of the programming code.

* * * * *